Nov. 14, 1933.    N. A. TORNBLOM    1,935,585
ROVING DEVICE FOR REELS
Filed April 2, 1930    4 Sheets-Sheet 1
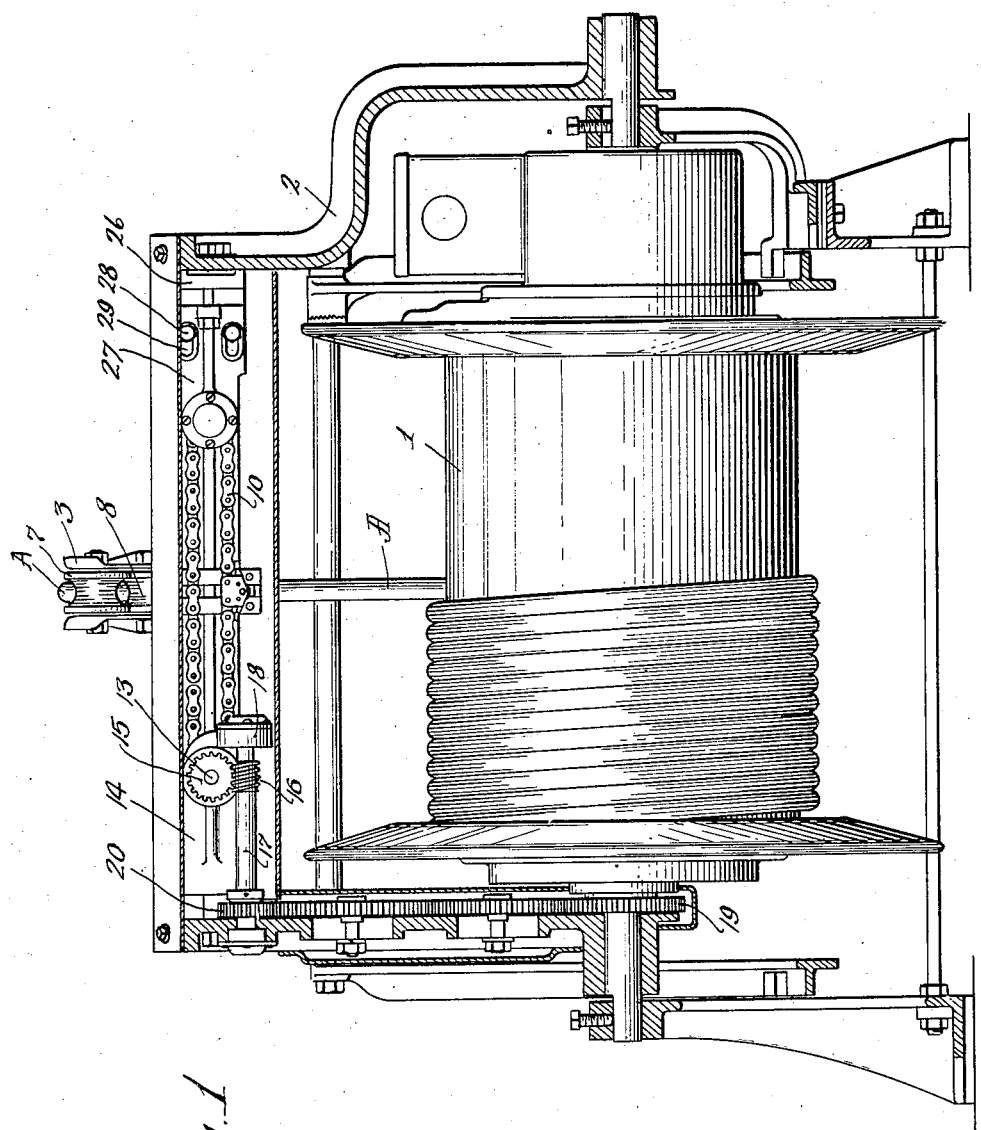

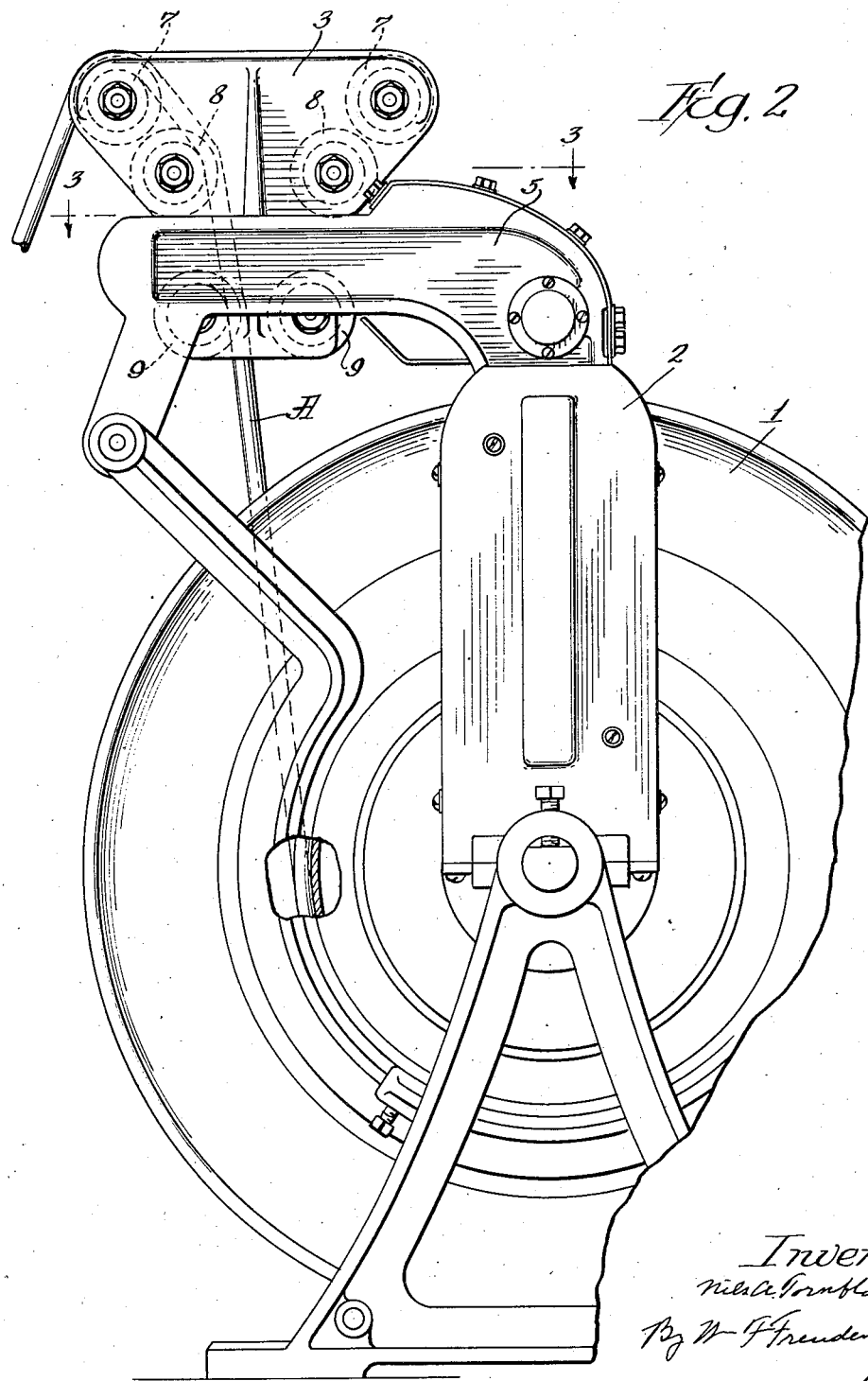

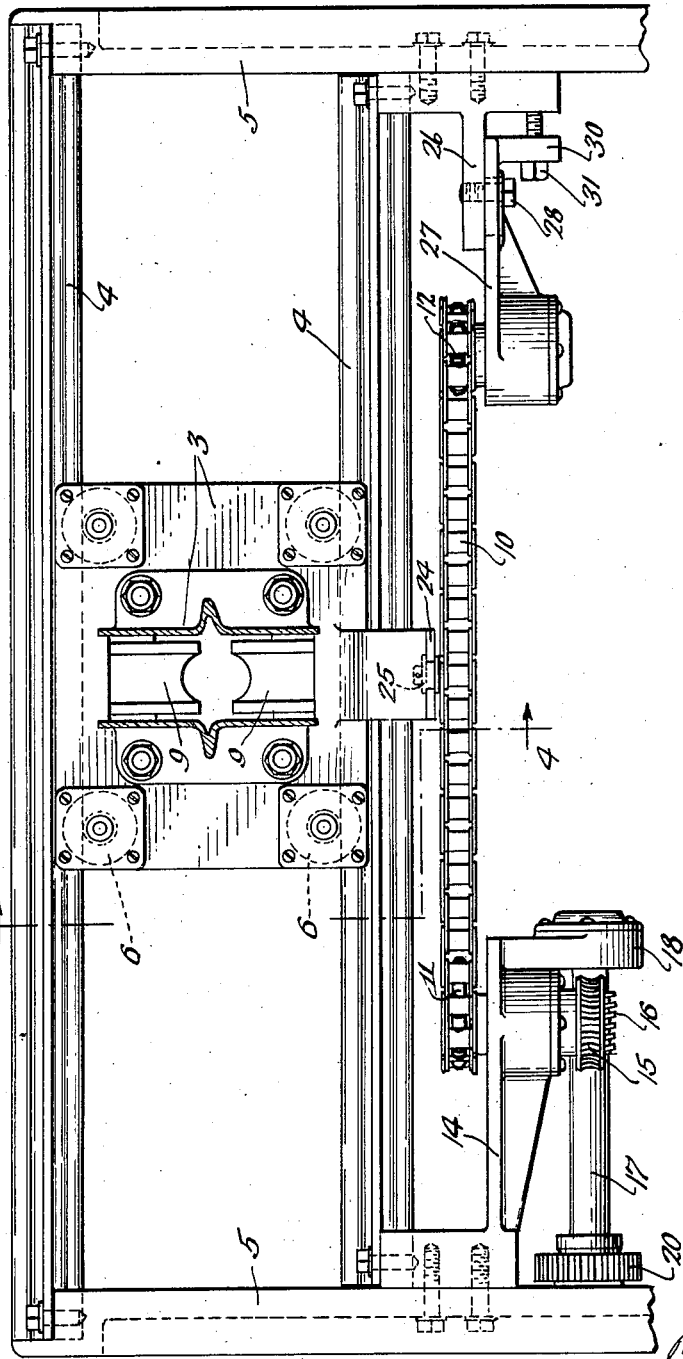

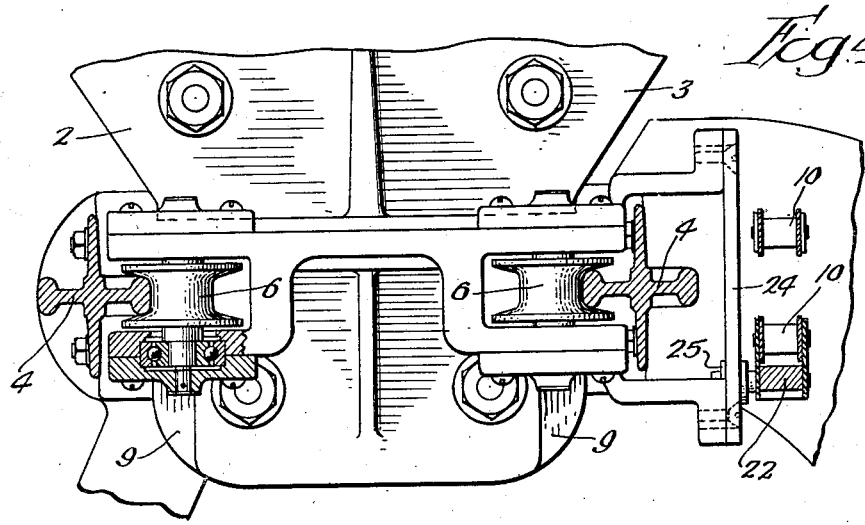
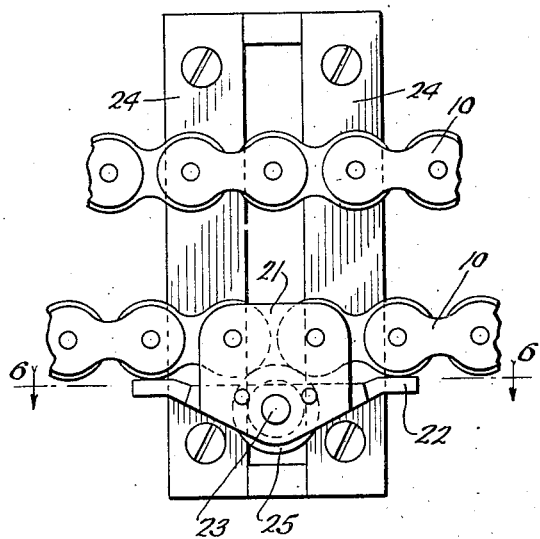
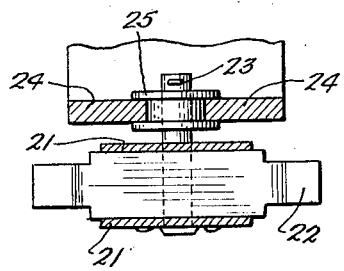

Patented Nov. 14, 1933

1,935,585

UNITED STATES PATENT OFFICE 1,935,585

ROVING DEVICE FOR REELS

Nils A. Tornblom, Chicago, Ill., assignor to Appleton Electric Company, a corporation of Illinois Application April 2, 1930. Serial No. 440,953

1 Claim. (Cl. 242—158)

The present invention has for its object to produce a simple, novel and rugged mechanism for guiding a cable or the like being wound upon or unwound from a reel; so as to lay it accurately upon the reel in winding or receive it in unwinding, without subjecting it to injurious stresses or straining it.

In carrying out my invention, I employ an endless chain or other flexible member so mounted as to afford two parallel runs extending parallel with the axis of rotation of the reel. On this chain is a projection engaged in a slot in a reciprocable cable guide that is movable back and forth parallel with the axis of the reel. The chain is driven from the reel in such time relation to the rotation of the reel that the part of the cable between the guide and the reel is always tangent to the reel at the point where the helix of a properly wound portion of the cable begins. The cable will therefore always wind and unwind evenly and without being strained.

The various features of novelty whereby my invention is characterized will hereinafter be pointed out with particularity in the claim; but, for a full understanding of my invention and of its objects and advantages, reference may be had to the following detailed description taken in connection with the accompanying drawings, wherein:

Figure 1 is a front elevation of a reel equipped with a roving device embodying the present invention, the frame and protective casing being shown in section; Fig. 2 is an end view, on a larger scale, parts of the reel and frame being broken away; Fig. 3 is a section on a still larger scale on line 3—3 of Fig. 2, the shield or cover being omitted; Fig. 4 is a section on line 4—4 of Fig. 3, on a still larger scale; Fig. 5 is an elevation of a fragment of the driving chain and part of the cable guide with which the chain coacts; and Fig. 6 is a section on line 6—6 of Fig. 5.

Referring to the drawings, 1 represents a reel for cable A or other flexible member, rotatably supported in a suitable frame 2. The reel structure may take any usual or suitable form as the present invention has to do with the roving device, only. The roving device consists of a carriage 3 mounted on a track device above the reel and parallel with the axis of rotation of the reel. In the arrangement shown, the track device consists of two rails 4, 4 fixed to arms or brackets 5, 5 constituting rearward extensions of the upper parts of the end members of the frame. On the under side of the carriage are four wheels 6 rotatable about vertical axes. These wheels have grooved peripheries and are so disposed that each rail is engaged in the grooves of two of the wheels. Therefore, the wheels interlock the carriage with the track so as to permit it to roll along the track and be held against movements relatively thereto in other directions.

The carriage is hopper-shaped and open at the top and bottom. In the interior or opening of the carriage are two sets of sheaves rotatable about axes parallel with the axis of rotation of the reel, one set in front and the other set at the rear. Each set is shown as consisting of three sheaves, 7, 8 and 9, the sheaves 7 being at the top, the sheaves 9 at the bottom, and the other two in the middle. The cable is threaded through the carriage and can be led off either toward the front or toward the rear, riding over the sheaves of one set or the other and being protected against abrasion.

The carriage must be reciprocated in definite time relation to the rotation of the reel in order accurately to rove the cable. To this end I have provided an endless sprocket chain 10 running over a pair of sprocket wheels 11 and 12 mounted on the arms or frame extensions 5 so as to position the chain near the track with its runs in a plane at right angles to the plane of the track; the chain driving the carriage and being in turn driven from the reel.

The sprocket wheel 11 is fixed to one end of a short shaft 13 journalled in and extending through a bracket 14 fixed to one of the arms 5. On the other end of the shaft 13 is a worm wheel 15. Meshing with the worm wheel is a worm 16 on a horizontal shaft 17 extending between and journalled in the adjacent frame member 5 and a flange 18 in the bracket 14. The shaft 17 is driven through a train of gears beginning with a gear wheel 19 on the reel and ending with a gear wheel 20 on the shaft.

One pair of the connecting plates between adjacent links of the chain is widened, as indicated at 21, so as to project outwardly from the body of the chain. Fixed between the projecting portions of the plates 21 is a bar 22 much longer than the plates and extending along the outer side of the chain in both directions from the plates. A stub shaft 23 is fixed to the plates 21 and projects therefrom toward the carriage. On the carriage, near the chain, are fixed two vertical bars 24, 24 spaced apart a distance somewhat greater than the diameter of the stub shaft. The stub shaft extends through the space between the bars and has thereon a wheel 25 free to rotate on and slide lengthwise of the shaft. The wheel is flanged on both sides so as to be interlocked with the bars against relative movements transversely of the bars and be permitted to move lengthwise of the bars in the slot bounded on the sides by the latter. The bars are longer than the distance between the bottom of the lower run and the top of the upper run of the chain and they extend past both runs.

It will be seen that when the reel is rotating, the chain will be slowly driven and, in turn, will cause the carriage to move slowly along the track. When the stub shaft and wheel on the chain reach one of the sprocket wheels they travel up or down the same, as the case may be, rising or falling in the slot between the bars of the carriage, the movement of the carriage becoming slower and then its direction being reversed. The parts are so proportioned that a cable threaded through the carriage will be accurately guided toward the reel so as to be evenly wound upon the same in one or more layers, in winding, and be properly led away from the reel as one or more layers are unwound.

In order that the sprocket chain may be placed and kept under the proper tension, I construct the sprocket wheel 12 on a two-part bracket, one part 26 of which is fixed to one of the frame extensions 5. The other part 27 of this bracket is secured in place by means of bolts 28 passing through elongated slots 29 therein into the part 26. The member 27 preferably has an ear 30 overlying and spaced apart from the base of the part 26; there being a bolt or screw 31 extending through the ear and into the said base, so that upon loosening the screws 28, adjustments may be made by turning the screw or bolt 31.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

In combination, a stationary frame, a reel mounted in said frame for rotation about a horizontal axis, stationary horizontal guides on the frame above the reel, a hopper-shaped carriage open at the top and bottom supported by said guides and movable along the same, driving means between the reel and the carriage to cause the carriage to move along the guides as the reel is turned, and sheaves in the upper portion of the carriage at the front and at the back to permit a cable or the like attached to the reel and passing up through the carriage to be guided by a sheave both when led rearwardly from and transversely of the axis of the reel and when led transversely of the axis of the reel in the forward direction.

NILS A. TORNBLOM.